March 27, 1945.  H. S. HERMANSON  2,372,273
FLUID PRESSURE MOTOR
Filed Nov. 21, 1941
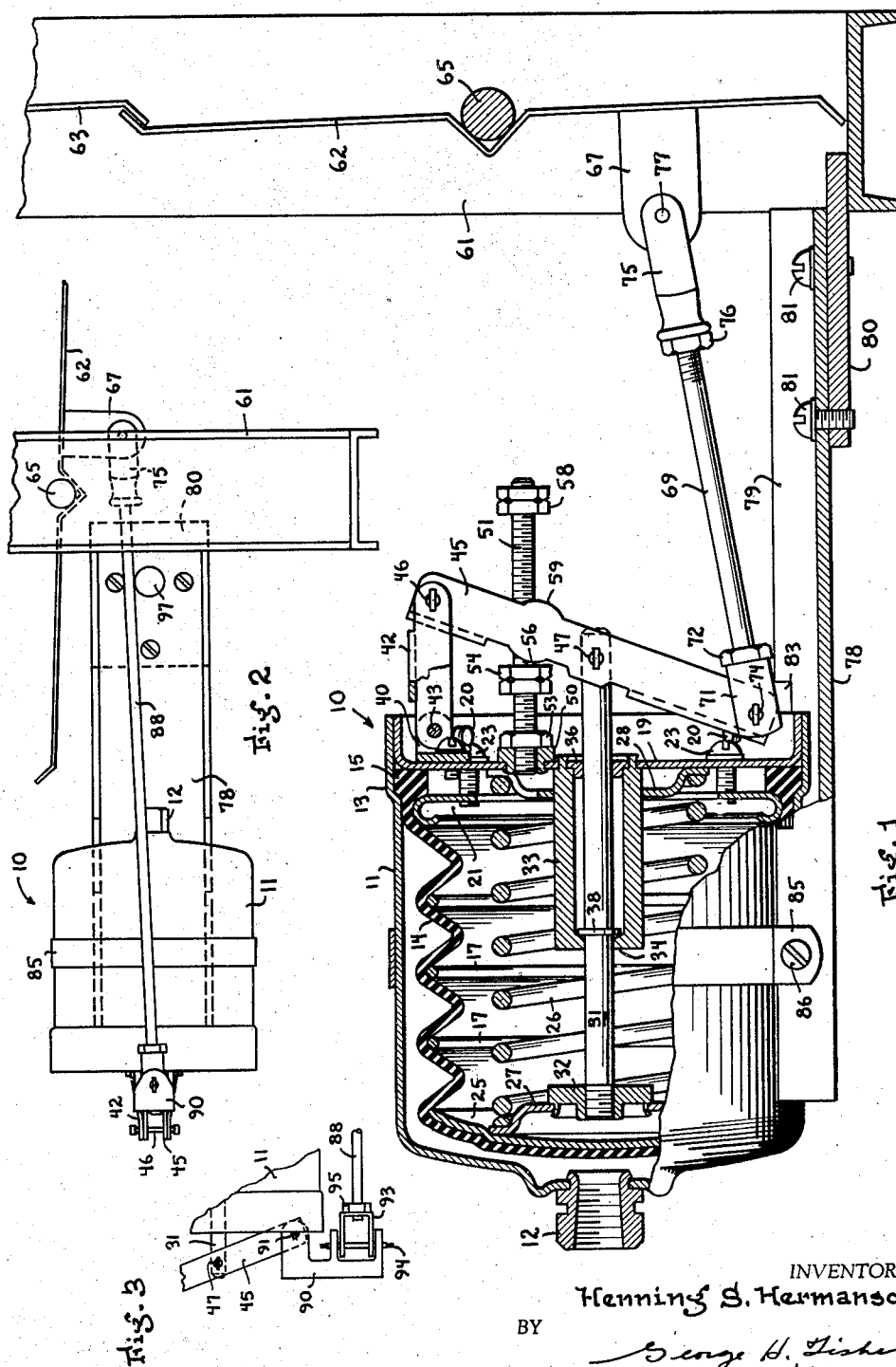
INVENTOR.
Henning S. Hermanson
BY
George H. Fisher
Attorney Patented Mar. 27, 1945

2,372,273

UNITED STATES PATENT OFFICE 2,372,273

FLUID PRESSURE MOTOR

Henning S. Hermanson, Chicago, Ill., assignor to Minneapolis-Honeywell Regulator Company, Minneapolis, Minn., a corporation of Delaware Application November 21, 1941, Serial No. 419,917

7 Claims. (Cl. 137—153)

This invention relates to fluid pressure actuated motors of a type which finds its principal application in the positioning of dampers, valves and similar devices.

It is customary to install motors of this type in pneumatic temperature control systems in which a thermostat varies the pressure in a "branch line" in accordance with temperature. The branch line is connected to a motor which varies the amount of heat supplied. Commonly, the motor positions a damper or valve. The motor of such a pneumatic system includes a diaphragm and resilient means opposing expansion of the diaphragm so that the motor moves the damper or valve to various positions depending on branch line pressure.

In various applications it is desirable that the motor be as small as possible. This is especially true where the motor in control of a damper must be located within a relatively small duct. In this case a small motor is essential, both because of mechanical space limitations, and because the free area through the duct is reduced by the space taken up by the motor. The conventional practice in sealing the container and the diaphragm in motors of this type is to provide a laterally extending flange on the diaphragm which extends beyond the open end of the container. Means are then provided for clamping the container to the diaphragm exteriorly of the container. Such construction results in a motor having an overall diameter considerably greater than the diameter of the container itself.

It is an object of this invention to provide an exceptionally compact fluid pressure actuated motor.

It is also an object of the invention to provide a fluid pressure actuated motor in which the overall size of the motor is only slightly greater than the size of the diaphragm contained therein.

Another object of the invention is to provide a fluid pressure motor in which the pressure chamber comprises the space between the outer container and a flexible diaphragm contained therein, the two being sealed together by forcing the diaphragm against the inside of the container.

Another object is to provide a means of sealing a diaphragm in a container comprising two members which are clamped together to force a portion of the diaphragm lying therebetween against the interior of the container.

A further object is to provide a fluid pressure motor in which one of the members which cooperates to seal the diaphragm in the container also serves as a support for the motor linkage and spring.

Another object is to provide a means of mounting the motor with respect to a damper whereby the motor can be set at various distances from the damper, can be rotated axially for convenient connection to the damper, or can be reversed so that increased pressure in the motor will either operate to open or close the damper.

Further objects will be apparent from the specification together with drawing, in which:

Figure 1 is a sectionalized view of a pneumatic motor incorporating various features of the invention, the motor being mounted on a damper frame;

Figure 2 is a view of the motor as connected to a damper and arranged so that the damper is open when no pressure is applied to the motor, and Figure 3 is a fragmentary plan view of the motor and linkage shown in Figure 2.

While the various features of the invention are applicable to various types of fluid pressure motors, they are here shown in connection with a pneumatic motor in which the control, or branch line, pressure is opposed by a spring to determine motor position.

Referring to Figure 1 of the drawing, a pneumatic motor is generally indicated at 10 and comprises a cup-shaped container 11 of generally cylindrical shape. To one end of container 11 is secured an air connection 12 which comprises an internally threaded plug. The pressure supplied to the motor through the connection 12 may be varied by a thermostat or other suitable control means. The interior of the plug 12 is rolled over to form a rigid mechanical connection with the container 11 and is additionally soldered to the container to form a pressure tight seal. The container 11, as mentioned above, is preferably of cylindrical shape and at its open end has a slightly enlarged cylindrical portion 13. On the interior of the container 11 a flexible diaphragm 14 preferably of some plastic material such as rubber or Neoprene is carried with its open end adjacent the open end of the container 11. The open end of the diaphragm 14 has an enlarged section 15 which lies against the interior of the container 11 at the enlarged portion 13. The diaphragm 14 is generally cup-shaped with its closed end adjacent the closed end of the container 11. The diaphragm 14 has a series of convolutions which collapse toward the right as pressure is applied thereto. Rings 17 lie within these convolutions and serve to support the diaphragm laterally.

An annular shaped ring or plate 19 is carried within the open end of container 11. The plate 19 is in the form of a shallow cup with its outer rim lying within the enlarged portion 13 of the container 11. The plate 19 is secured to the container 11 by means of screws 20 only the inner ends of which appear on the drawing. While the plate 19 is permanently secured to the container 11, there is no attempt to form a pressure tight seal therebetween. The inner surface of the plate 19 engages the outer end of the diaphragm 14 and abuts its enlarged portion 15.

Carried within the outer end of the diaphragm 14 is an annular ring 21 which is of slightly larger diameter than the interior diameter of the enlarged portion 15 at the outer end of diaphragm 14. The surface of the ring 21 which engages the portion 15 of the diaphragm 14 is of torodial form. The plate 19 and the ring 21 are secured together by means of screws 23. It will be noted that as the screws 23 are tightened, the ring 21 and the plate 19 are drawn together thereby forcing the enlarged portion 15 of the diaphragm 14 outwardly against the interior surface of the container 11. This diaphragm 14 is of plastic material and when it is forced outwardly against container 11 a pressure tight seal is formed therebetween. Thus it will be seen that the container 11 and the diaphragm 14 are effectively sealed and the resulting structure is no larger than the outside diameter of the container 11.

A pressure plate 25 is carried on the interior of the closed end of the diaphragm 14. A compression spring 26 acts on a spring abutment 27 which lies against the pressure plate 25 and on an abutment 28 which lies against plate 19. The spring 26 is therefore effective to force the pressure plate 25 towards the left and tends to expand the diaphragm 14.

A rod 31 which is located concentrically of the container 11 and diaphragm 14 carries a nut 32 at its inner end, and this nut 32 is secured to the abutment 27. The rod 31 is constrained in axial movement by a guide 33 which is suitably mounted in the central opening on the annular shaped plate 19. The inner end 34 of the guide 33 serves as a bearing for the rod 31. The rod 31 is also guided by a plug 36 which is secured to the interior of the outer end of the guide 33. A collar 38 on the rod 31 engages the inner end 34 of the guide 33 when the rod is toward the left and serves to limit the motion of the rod 31 to the left. Movement of the rod 31 to the right is limited by engagement of the end 34 of the guide 33 with the nut 32.

A member 40 having a pair of upstanding portions is secured to the outer surface of the plate 19. A bifurcated link 42 is pivoted to the member 40 on a pin 43. A lever 45 is pivoted to the outer end of the link 42 on a pin 46 and is further pivoted to the outer end of the rod 31 on a pin 47. It will be noted that the lever 45 lies entirely within the projected area of the diaphragm 14 and the container 11. This construction enables the motor to be mounted in many different ways, as will be hereinafter pointed out. While maximum movement of the rod 31 and therefore of the lever 45 is determined by engagement of the collar 38 and the inner end 34 of the guide 33 and also by engagement of the nut 32 with the portion 34 of the guide 33, means are also provided to further limit this movement to any range desired. A nut 50 is suitably secured to the outer surface of the plate 19 and carries a screw threaded rod 51 which extends outwardly and parallel to the rod 31. Movement of the rod 51 in the nut 50 is prevented by means of a lock nut 53. A pair of nuts 54 may be adjusted to engage a rounded portion 56 of the lever 45 to limit clockwise rotation of the lever 45 while a pair of nuts 58 may be adjusted to engage a second rounded portion 59 on the lever 45 to limit counter-clockwise movement of the lever 45. Although it is desirable that the motor be so arranged with relation to the mechanism being controlled that full motor stroke or diaphragm stroke is utilized, it may often be necessary to limit the stroke below this value.

Motor 10 is here shown as being in control of a normally closed type of louver damper. A rectangular damper frame 61 made up of channel section material has pivoted thereto a pair of louver dampers 62 and 63. It will be understood that the motor could equally well be applied to a damper having any other type of frame. Louver 62 is pivoted in the frame 61 on a rod 65. Any suitable cross-connection between the louvers 62 and 63 may be employed although for the sake of simplicity none is shown here. The louver 62 has an ear member 67 secured to the surface thereof below the rod 65 and extending toward the motor 10. A link 69 serves to connect the louver 62 and the lever 45. A clevice 71 is secured to the link 69 by means of screw threads on the link 69 and a lock nut 72. The clevice 71 is pivoted to the lever 45 by means of a pin 74. A clevice 75 is screw threaded to the right-hand end of the link 69 and is locked with respect thereto by means of a lock nut 76. A pin 77 serves to pivotally connect the clevice 75 and the ear 67 on the louver 62. The effective length of the link 69 may be adjusted by screwing either of the clevices 71 or 75 in or out on the link 69. The same effect may be obtained by moving the motor 10 relative to the damper as will be pointed out hereinafter.

Motor 10 is secured to the damper frame 61 by means of a universal mounting bracket 78. The bracket 78 comprises a channel shaped member having edges 79 extending upwardly. A flat plate 80 is suitably secured to the damper frame 61 and is preferably welded thereto. The bracket 78 is secured to the plate 80 by means of screws 81. The container 11 lies along the open channel of the bracket 78 and the enlarged portion 13 of the container 11 lies within a pair of notches 83 cut in the upwardly extending edges 79 of the bracket 78. Notches 83 are of such a length that considerable lengthwise adjustment of the motor 10 in the bracket 78 is possible. In order to secure the motor 10 to the bracket 78, a strap 85 is provided which passes around the container 11 and is secured to the opposite sides of the bracket 78 by means of screws 86. The strap 85 is of such a length that tightening the screws 86 will securely clamp the motor to the bracket 78.

While in the illustrated embodiment of the invention the motor is shown mounted to the damper frame 61 on the bottom surface of the frame, in certain applications it may be desirable to mount the bracket 78 on the frame 61 at a point on the side of the frame adjacent the louver pivot 65. If the bracket is so located it is necessary to loosen the strap 85 and rotate the motor ninety degrees with respect to the bracket 78 so that the pivot 77 on the louver 62 and the pivot 74 on the lever 45 would be parallel. It is also possible to adjust the distance between the motor and the damper by moving the motor lengthwise with respect to the bracket 78 in order to provide proper damper movement.

In certain applications it may be necessary that the damper be in its open position when no air pressure is applied to the motor. The manner in which this motor is carried to the mounting bracket enables the motor to be reversed with respect thereto so that the open end of the container 11 faces away from the damper. Such an arrangement is shown in Figure 2 of the drawing. In this case, the link 69 connecting the damper and the motor as shown in Figure 1 is replaced with a link 88 which extends alongside the container 11 and connects with the lever 45 in a manner which is best seen in Figure 3. A universal connection between the lever 45 and the link 88 is provided by means of a member 90 which is pivoted to the lever 45 on a pin 91 pivoted to a clevice 93 on a pin 94. The link 88 is screw threaded to the clevise 93 and is locked with respect thereto by means of a nut 95. This construction both provides a universal connection between the lever 45 and the link 88 and also provides a connection in which the same movement of link 88 is equal to that of the pin 91 which connects the member 90 and the lever 45. In this way, the motor may be applied to a damper in such a way as to hold it either normally open or normally closed without any alteration in the construction of the damper and the pivot associated with the damper louver.

The bracket 78 may also be mounted on the outer surface of the frame with the hole 97, as seen in Figure 2, placed over the end of the louver pivot rod. In this case an arm must be attached to the pivot rod and the link connecting the motor and the damper pivoted to this arm.

Although the motor is here shown applied to a damper, it could equally well be applied to various other devices. It will be seen that a motor having a very small outside diameter has been provided and one which is capable of universal application. It will be understood that the illustrated embodiment of the invention is merely exemplary and various other applications of the various ideas disclosed herein will be apparent to those skilled in the art. I am therefore to be limited only by the scope of the appended claims.

I claim as my invention:

1. In a fluid pressure actuated motor, in combination a container, a diaphragm mounted within said container and movable in response to fluid pressure, a guide member mounted within the interior of said container, an abutment adapted to cooperate with the movable portion of said diaphragm, a rod operatively connected to said abutment and slidable in said guide member, said rod having a laterally extending portion movable within and cooperable with said guide member in limiting movement of said diaphragm in one direction, movement of said diaphragm in the opposite direction being limited by cooperation of said abutment and said guide member.

2. In a fluid pressure actuated damper, in combination, a damper frame, a damper pivoted in said frame, a container having an open end, means for mounting said container with its open end away from said frame, an annular ring secured to said container adjacent the open end thereof, a cup-shaped diaphragm within said container and having its open end sealed to the open end of said container, a rod operatively connected to said diaphragm and extending outside said container, a lever attached to said ring though a pivotal connection and pivoted to said rod, said lever lying entirely within the projected area of said diaphragm, a link operatively connected to said damper and extending along the side of said container, and a member pivoted to said link on an axis lying in the plane of movement of said lever, said member also being pivoted to said lever on an axis lying in a plane at right angles to the plane of movement of said lever, whereby movements of said link are of the same magnitude as movements of the portion of said lever to which said link is connected.

3. In a fluid pressure motor, in combination, a generally cylindrical container having a closed end, a cup-shaped diaphragm located entirely within said container and having an open end of enlarged section lying against the interior of said container, said cup shaped diaphragm arranged so as to form a pressure chamber between said container and said diaphragm, a flange extending inwardly from said container and lying against the open end of said diaphragm, an annular ring lying within the open end of said diaphragm, said ring having an outside diameter slightly larger than the interior diameter of the enlarged section of the open end of said diaphragm, and means connecting said ring to said flange and adapted to draw them together for compressing said enlarged section of said diaphragm against said ring, said flange, and said container to seal said pressure chamber.

4. A damper control motor of the fluid pressure type comprising in combination, a container, a flexible cup shaped bellows of plastic material mounted within said container, said bellows having a series of convolutions provided therein, a plurality of rings positioned within said bellows at said convolutions for supporting said flexible plastic bellows, a rigid member mounted at the closed end of said cup shaped bellows, a rod engaging said rigid member, spring means for holding said rod in engaging relation with said rigid member for supporting said flexible bellows in an extended position, a fluid pressure inlet for said container positioned adjacent to said closed end for actuating said bellows and said rod in response to force exerted by said fluid pressure, a flared edge mounted at the open end of said cup shaped bellows and one of said rings engaging said flared edge, an annular member secured to said container adjacent the open end of said container, and means carried by said annular member for engaging said one ring so as to cause said one ring to press said flared edge of said cup shaped bellows against the inner surfaces of said container and said annular member to form a pressure tight seal between said flared edge and said container and thereby affix said bellows at the flared edge within said container.

5. In a fluid pressure motor, in combination, a container having a portion of its inner surface of cylindrical form and one diameter, another portion of cylindrical form and larger diameter, thereby providing a shoulder between said portions, a flexible member carried entirely within said container and having an annular enlargement lying against said shoulder, a movable disk within said flexible member back of said shoulder, a fixed disk in the larger diameter portion of said container and a plurality of screws through said fixed disk and threaded into said movable disk for compressing said annular enlargement against said shoulder for forming a seal therebetween.

6. In a fluid pressure motor of the class described, in combination, a container having an annular shoulder, a flexible member carried entirely within said container to form a pressure chamber between said container and said flexible member, said flexible member having an annular enlargement against said annular shoulder, and second and third members fixed and movable respectively relative to said container and engaging said annular enlargement between them to compress it against said annular shoulder for forming a seal between said container and said flexible member.

7. In a fluid pressure actuated device, in combination, a container having an open end, means for mounting said container, a cup-shaped diaphragm within said container having its open end connected to said container and having an imperforate bottom, a rod operatively engaged with said diaphragm bottom and extending outside said container, a lever attached to said container through a pivotal connection and pivoted to said rod, and an actuating link pivoted in the free end of said lever whereby movement of said diaphragm positions said link, said lever and said link lying entirely within the projected area of said diaphragm.

HENNING S. HERMANSON.